US012802696B2

(12) United States Patent
Charlesworth et al.

(10) Patent No.: US 12,802,696 B2
(45) Date of Patent: Nov. 17, 2026

(54) SECURE SCALABLE TRANSMISSION OF PACKET URL INSTRUCTIONS FOR SECOND SCREEN APPLICATIONS IN DIGITAL TRANSMITTED PROGRAM MATERIAL

(71) Applicant: Audazzio, Inc., San Antonio, TX (US)

(72) Inventors: Roger Charlesworth, Kittery Point, ME (US); Shane G. W. Morris, Baltimore, MD (US); Andrew Smith, Santa Barbara, CA (US)

(73) Assignee: Audazzio, Inc., San Antonio, TX (US)

( * ) Notice: Subject to any disclaimer, the term of this patent is extended or adjusted under 35 U.S.C. 154(b) by 46 days.

(21) Appl. No.: 18/998,932

(22) PCT Filed: Jul. 27, 2023

(86) PCT No.: PCT/US2023/028859

§ 371 (c)(1),
(2) Date: Jan. 27, 2025

(87) PCT Pub. No.: WO2024/026025

PCT Pub. Date: Feb. 1, 2024

(65) Prior Publication Data

US 2026/0024536 A1 Jan. 22, 2026

Related U.S. Application Data

(60) Provisional application No. 63/369,614, filed on Jul. 27, 2022.

(51) Int. Cl.
*G10L 19/018* (2013.01)
*G06F 16/955* (2019.01)
(Continued)

(52) U.S. Cl.
CPC ....... *G10L 19/018* (2013.01); *H04N 21/4394* (2013.01); *H04N 21/4622* (2013.01); *H04N 21/8358* (2013.01); *H04N 21/8586* (2013.01)

(58) Field of Classification Search
CPC .............. G10L 19/018; H04N 21/4394; H04N 21/4622; H04N 21/8358; H04N 21/8586;
(Continued)

(56) References Cited

U.S. PATENT DOCUMENTS

| | | | | |
|---|---|---|---|---|
| 7,509,490 B1 * | 3/2009 | Hsu | H04L 63/0407 713/153 |
| 11,557,303 B2 * | 1/2023 | Hicks | G10L 19/018 |

(Continued)

FOREIGN PATENT DOCUMENTS

WO 2022233385 A1 11/2022

OTHER PUBLICATIONS

Thakur et al. A Review of Secret Message Hiding Algorithm in Audio File. International Journal of Engineering Research & Technology (IJERT) vol. 2 Issue 10, Oct. 2013. [retrieved online Oct. 3, 2023] Retrieved from the Internet <URL: https:f/d1wqtxts1xzle7.cloudfront.net/67319824/a_review_of_secret_message_hiding_algorithm_in_audio _file _IJERTV2IS10077 4-libre.pdf?1620987029=&response-conten••disposition=inline%3B+filename%3DIJERT _A_review _of_secret_message _hiding.pdf&Expires =1696380677&Signature=OJMmxY1.

(Continued)

*Primary Examiner* — Darren B Schwartz
(74) *Attorney, Agent, or Firm* — Berg Hill Greenleaf Ruscitti LLP

(57) ABSTRACT

The present invention generally relates to systems and methods for the efficient and secure creation of unique identifier associated with submitted URLs and the transmission and processing of encrypted signals by a receiving
(Continued)

device, and in particular an audio transmission and processing of encrypted unique inaudible signals by a receiving device that may direct the receiving device to initiate an action, such as directing the receiving device to request an associated Uniform Resource Locator (URL) to then access a specific URL or other digital content through a browser application. The decoding and processing of the transmitted signal is operated on prior to the signal being played through the receiving devices speaker system(s). Consideration of the available signal bit rate is another aspect of the system's operational integrity.

20 Claims, 5 Drawing Sheets

(51) Int. Cl.

| | |
|---|---|
| ***H04L 9/32*** | (2006.01) |
| ***H04N 21/439*** | (2011.01) |
| ***H04N 21/462*** | (2011.01) |
| ***H04N 21/81*** | (2011.01) |
| ***H04N 21/8358*** | (2011.01) |
| ***H04N 21/858*** | (2011.01) |

(58) Field of Classification Search
CPC . H04N 21/8106; H04L 9/321; H04L 2209/60; G06F 16/955
See application file for complete search history.

(56) References Cited

U.S. PATENT DOCUMENTS

| | | | | |
|---|---|---|---|---|
| 2012/0036226 | A1* | 2/2012 | Chor | G06K 1/12 709/219 |
| 2013/0191637 | A1 | 7/2013 | Smaak et al. | |
| 2013/0204415 | A1* | 8/2013 | Fregley | G06Q 30/02 700/94 |
| 2014/0172141 | A1 | 6/2014 | Mangold | |
| 2020/0021867 | A1 | 1/2020 | Park et al. | |
| 2020/0082816 | A1* | 3/2020 | Mahajan | G10L 15/30 |
| 2020/0286086 | A1* | 9/2020 | Chanduri | G06Q 20/3827 |
| 2021/0035589 | A1* | 2/2021 | Hicks | H04L 65/61 |
| 2021/0120057 | A1 | 4/2021 | Estus et al. | |
| 2021/0274312 | A1 | 9/2021 | Wolcott et al. | |
| 2022/0358943 | A1 | 11/2022 | So | |

OTHER PUBLICATIONS

International Search Report and Written Opinion with mailing date of Nov. 3, 2024, 18 pages.

* cited by examiner

SECURE SCALABLE TRANSMISSION OF PACKET URL INSTRUCTIONS FOR SECOND SCREEN APPLICATIONS IN DIGITAL TRANSMITTED PROGRAM MATERIAL

CROSS REFERENCE TO RELATED APPLICATION

This application is a national stage application under 35 U.S.C. 371 of PCT Application No. PCT/US23/28859 having an international filing date of Jul. 27, 2023, which designated the United States, which PCT application claimed the benefit of U.S. Application Ser. No. 63/369,614, filed Jul. 27, 2022, both of which are incorporated by reference in their entirety.

TECHNICAL FIELD

The present invention generally relates to novel systems and methods for securely transmitting and processing encrypted digital content by a receiving/decoding device, and in particular the secure transmission of a packet instruction to a mobile and/or fixed device responsive to an audio signal data stream as found in a typical podcast format or any digital audio transmission. The instructions provided to the receiving/decoding device may automatically, or alternatively generate a prompt to the end user requesting to direct the device to access a website, or other digital content. This system and method is not limited to podcast transmitted type program material and can be applied to a receiver application typically found in/on "smart" televisions, phones, or other program viewing applications such as streaming services and the like. In additional embodiments, the steps of decoding and processing the packet information utilizes digital signal processing (DSP) prior to, or in parallel to, the audio signal as it is presented to the receiving device's speaker system(s). The present invention also takes into consideration the available signal data rates available and implemented in the creation and distribution of digital streamed audio signals in particular podcast bit rates, however, again these data rate limitations are not limited to podcast transmissions.

BACKGROUND

As the transmission and display of digital content reaches more and more consumers through the pervasive use of podcast and other audio and digital applications on mobile and fixed computer devices as well as wireless technologies, content creators, distributors, and advertising companies are seeking additional ways to provide podcast content support through the addition of secure packet directives that allow a customized and immersive consumer end user experience. One proposal includes the use of second screen experiences wherein content creators and providers can coordinate one or more digital devices to present a multi-screen presentation in conjunction with the podcast or OTT/broadcast transmission and the like. It should be understood that no such system currently exists for the podcast or audio delivery domain. This is because certain limitations prevent the widespread deployment of such strategies.

First, individual content creators lack a simple and secure method to generate an immersive second-screen experience for remote end user consumers. Second, content providers, such as podcast distributors and broadcast and Over The Top ("OTT") providers are restricted in their ability to adapt their signal transmission and reception parameters to generate an immersive second-screen experience for remote consumers. For example, cable and OTT streaming services lack excess bandwidth to include additional video and surround audio that can be displayed on a second screen. Notably, the only frequency range available is to deliver the packet instructions as an inaudible, or ultrasonic range of the audio portion of a broadcast or streamed signal. In fact, the ultrasonic range is considered by definition as below 20 Hz or above 20 KHz as will be discussed the highest frequency is bandwidth bit rate determined and as such cannot pass the above 20 KHz frequencies. Podcasts are even more compromised with generally lower bit rates. It is therefore important to optimize the selected frequency bands for the packets to suit as in this present invention.

Others have suggested using such inaudible signals to passively or actively communicate and provide secondary digital content to a remote device, such as a mobile phone or tablet, however such attempts have been limited and do not include the digital decoding as is present in the current invention. For example, Williams et al., (U.S. Pat. No. 11,126,394) describes the use of hidden data embedded in inaudible audio signals, however such system lacks sufficient encryption protocols to securely deliver the hidden data and further lacks sufficient connections to traditional internet architecture to bypass technical bottlenecks inherent in its system. Further, the system of Williams lacks the ability to integrate third-party content generators into the system to allow for a more targeted delivery of digital content.

In another example, Mufti at el., (U.S. Pat. No. 10,044,448) describes the transmission of audible and inaudible signals containing data that directs an action on a device according to a user's customized profile. Again, the system of Mufti is limited as it lacks sufficient encryption protocols to securely deliver such signal encoded data. It further lacks efficient use of existing traditional internet architecture to store and transmit encrypted digital content to a user's mobile device, without having to provide the entirety of the digital content in the audio signal. The system of Mufti further lacks the ability of content producers to direct the digital content to be activated on a second screen.

Finally, Shah at el., (U.S. Pat. No. 9,299,386) provides resource identifiers encoded within an inaudible signal which is created by the content provider and transmitted to a user's device, which is then used to retrieve or identify a resource such as a webpage or other resource. However, the system of Shah is limited in its ability to securely embed and transmit both audio signals and digital content to a mobile and fixed device. None of the above prior art suggests the digital decoding of packet information prior to audio playing.

As can be seen, there exists a long-felt need for a system to securely allow for the efficient generation and transmission of specific and secure digital content, such as packet URL instructions embedded in inaudible audio signal to a mobile and fixed receiving device, wherein the system further allows for a novel second layer of security by initiating an authenticatable return encrypted URL request, in addition the digital decoding of packet signals. As can be further seen, all prior art does not recognize the various bit rate limitations of delivery mechanisms.

SUMMARY OF THE INVENTION

In one aspect, the present invention generally relates to systems and methods for the efficient transmission and processing of encrypted inaudible/ultrasonic audio signals. In one aspect, the present invention allows encrypted audio signals to be extracted using DSP prior to the audio being played via a speaker or Bluetooth or any other connected audio reproduction system, including multi-channel audio playback systems, all of which being generally referred to as a speaker. Typically, this would be implemented in a Podcast digital environment but is not limited to podcast digital delivery. Any smart television or other similar application is subject to this technology.

In this preferred aspect, the present invention includes systems and methods configured to allow one or more third-party content providers to generate specific digital audio content, such as a podcast, which may be associated with a unique identifier that may be embedded in the digital audio content as an executable audio file, and preferably and executable audio file configured to generate an audible, subaudible, and/or inaudible signal. This inaudible signal embedded with a unique identifier may be transmitted or downloaded to a receiving device with the digital audio content, which may preferably be part of a podcast, broadcast or other similar digital media presentation including stored media such as DVD and CD. The inaudible signal may be received and identified by a receiving device, such as mobile or fixed device application and trigger one or more actions, which in a preferred aspect include sending a request for the digital content associated with the embedded unique identifier. This request can be authenticated, such that the stored digital content, such as a URL may be transmitted to, and displayed on the receiving device, for example through a traditional wired or wireless network.

In another aspect, the present invention allows a third-party content generator to create a unique identifier based on submitted digital content to a proprietary secure server. In one preferred embodiment, the digital content of the invention may include an internet Uniform Resource Locator (URL), a Uniform Resource Identifier (URI), a Uniform Resource Number (URN), a domain name, or an Internet Protocol (IP) address or a combination of the same, all being generally referred to herein as a URL. The resultant unique identifier can then be embedded into any audio stream, also referred to herein generally as an audio signal. The unique identifier is then received by a receiving, extracting device (sometimes generally referred to as a receiving device or receiver), which may generally include a mobile or fixed computer device, typically a phone, tablet or smart television or other computer that may include a computer executable program configured to receive, isolate, extract, decode and/or identify the embedded unique identifier transmitted by the audio signal, for example through one or more digital signal processor (DSPs). The receiving device is programmed to contact the secure server with a URL request, sometimes referred to herein as a packet URL request or URL request. The URL request can be authenticated by comparing the unique identifier provided in the URL request with the unique identifier stored on the secure server that is associated with the target URL. If the unique identifiers match, the URL request is authenticated and the URL, which may be encrypted, is provided to the receiving device, where it may further be decrypted. As describe herein, the transmission of a URL, generally in the form of a packet URL instruction, to a receiving device may include a URL instruction that may cause the receiving device to access that URL and display the contents of the associated website on the receiving device's screen, or other visual interface.

In another aspect, the present invention allows a third-party content generator to create a unique identifier based on a submitted internet URL to a proprietary secure server. The resultant unique identifier can then be transmitted through any digital signal, such as a wired or wireless internet or cellular signal and then received by a receiving device, such as a mobile device that includes a computer, smart television or executable program configured to receive and identify the unique identifier transmitted by the digital signal. The receiving device is programmed to contact the secure server with a packet URL request. The URL request can be authenticated by comparing the unique identifier provided in the URL request with the unique identifier stored on the secure server that is associated with the target URL. If the unique identifiers match, the URL request is authenticated and the URL, which may be encrypted, is provided to the receiving device, where it may further be decrypted through a digital signal.

In another aspect, the proposed inventive technology is directed to a system to coordinate one or more digital devices through various embedded audio signals, and preferably inaudible audio signals. Broadly, in this aspect, the invention allows a third-party content provider to coordinate and encrypt a specific Uniform Resource Locator (URL) via a unique packet on a secure server which can be embedded in an inaudible audio signal and transmitted to a receiving device, such as a smart television or personal computer, phone or tablet configured to receive and decode the inaudible signal. The receiving device includes a computer executable program configured to request a response from the encoding secure server and then authenticate the request and provides the URL instruction to the receiving device such that it automatically directs the device to the specific URL-associate webpage.

In another aspect, the invention allows a third-party content provider, such as a content creator, broadcaster, marketer, streaming provider, podcast delivery and the like, to securely encrypt and deliver a target URL to a viewer's mobile device, such as a smartphone or tablet or other similar receiving device as described herein. In this preferred aspect, a third-party content provider submits a target URL to a secure server which generates a unique encrypted code, generally referred to herein as a unique identifier that is based on/correlated with the submitted URL. This unique identifier can form an encrypted packet that may further be integrated into an audio file thereby embedding the unique identifier in the audio signal, such as a podcast or other similar audio broadcast, as an inaudible audio signal. The embedded audio signal initiates an executable program which directs the device to request the URL from the secure server where the request for the specific URL is authenticated. Once authenticated, the requested URL is transmitted to the receiving device where it may further be decrypted. The receiving device then connects to that submitted URL-associated website and the resultant content is displayed on the receiving device's screen.

In another aspect, an inaudible audio signal embedding an encrypted packet of the invention may be to be programed to be compatible with for the available bandwidth for transmission of a certain applications such as streaming a podcast or other digital audio content and the like.

Additional aspects of the invention may be evident from the detailed descriptions, figures and claims provided herein.

BRIEF DESCRIPTION OF FIGURES

The above and other aspects, features, and advantages of the present disclosure will be better understood from the following detailed descriptions taken in conjunction with the accompanying figures, all of which are given by way of illustration only, and are not limiting the presently disclosed embodiments, in which.

DETAILED DESCRIPTION OF THE INVENTION

The embodiments herein and the various features and details thereof are explained more fully with reference to the non-limiting embodiments that are illustrated in the accompanying drawings and detailed in the following description. Descriptions of well-known components and processing techniques are omitted to avoid unnecessarily obscuring the embodiments herein. Also, the various embodiments described herein are not necessarily mutually exclusive, as some embodiments can be combined with one or more other embodiments to form new embodiments. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

Figure 1:
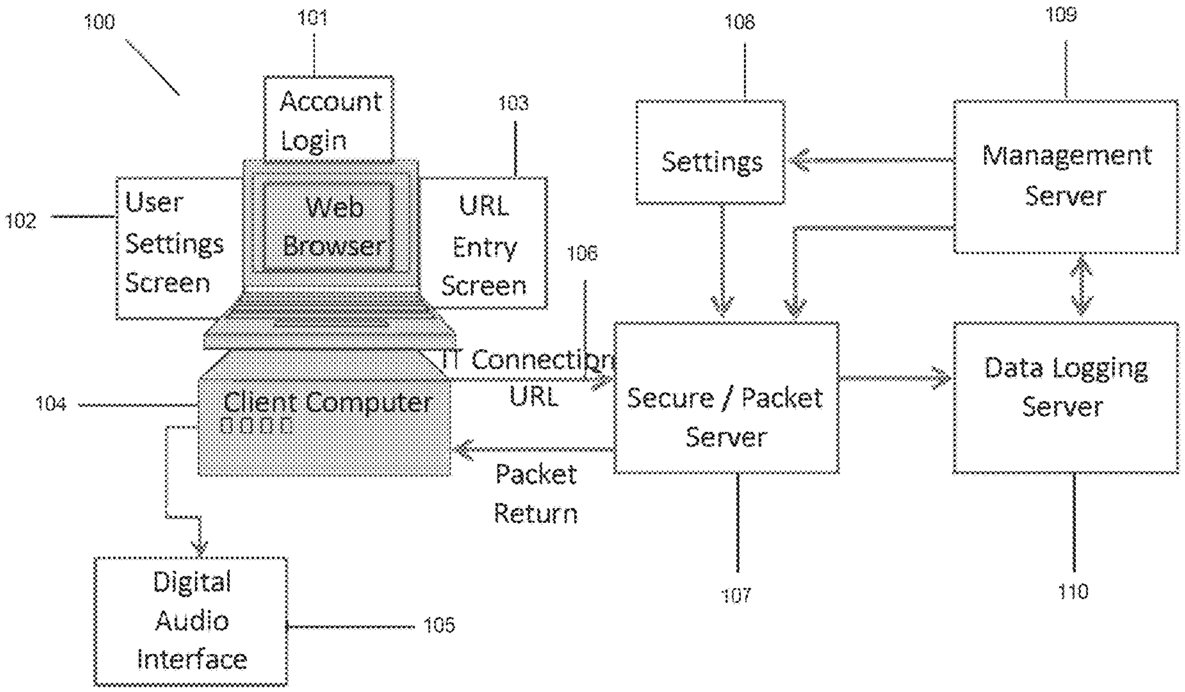
FIG. 1 shows the functional operation of an exemplary encode process of the invention's secure transmission and processing system in one embodiment thereof.

In one preferred embodiment shown in FIG. 1, includes the functional operation of an exemplary encode process of the invention's secure transmission and processing system (100), which according to the present invention includes the login screen that may be accessed by a digital audio content creator or distributor (sometimes being generally referred to herein as a "client") as described herein, and connection to the host server for URL submission and packet creation, return of packet for introduction to transmit medium, in one embodiment thereof.

Specifically, in the embodiment shown a client computer system (104) may include a client login screen, having preferably a dual factor authentication secure login (101) that permits client access to a website or other application having a user settings screen (102) including client parameter setups, presets, macros and file management as well as a URL entry screen (103) allowing a client to generate one or more URL submissions to be transmitted to a client packet server, also referred to as a client server or more preferably a secure server (107) for further processing, preferably through a LAN/IT connection. In this embodiment, the secure server (107) of the invention generates an encrypted packet, which may be communicated back to a client's computer system (104) and may further be configured to store a URL to be transmitted, which may further be stored in an encrypted configuration.

The secure server (107) of the invention may be responsive to a settings module (108) which may control the settings and control of secure server (107) and may further be a separate or integral module of the client server (107). The secure transmission and processing system (100) according to the present invention further may include a management server (109) configured to control the parameters and operation of the secure server (107), preferably through management of the settings module (108). The invention may further include a data logging server (110) configured to be responsive to said management server (109) and/or said secure server (107) and further manage storage of login and client usage information in one embodiment thereof. The secure transmission and processing system (100) according to the present invention further may include a digital audio interface (105) responsive to the client computer system (104) configured to transfer one or more encrypted packets to a digital audio workstation to facilitate integration into an audio signal to be transmitted to a user's receiving device.

Figure 3:
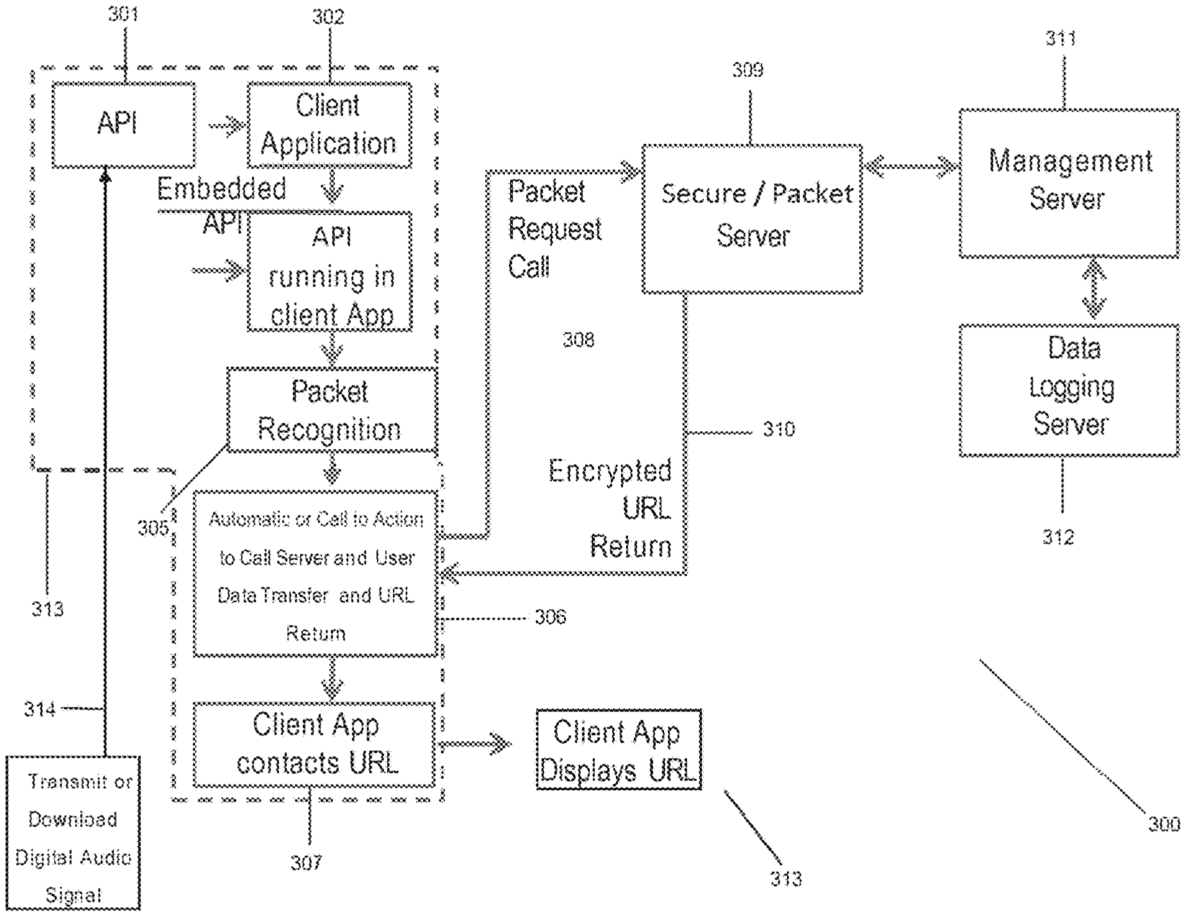
FIG. 3 shows the functional operation of an exemplary decode process of the invention's secure transmission and processing system in one embodiment thereof.
Figure 5:
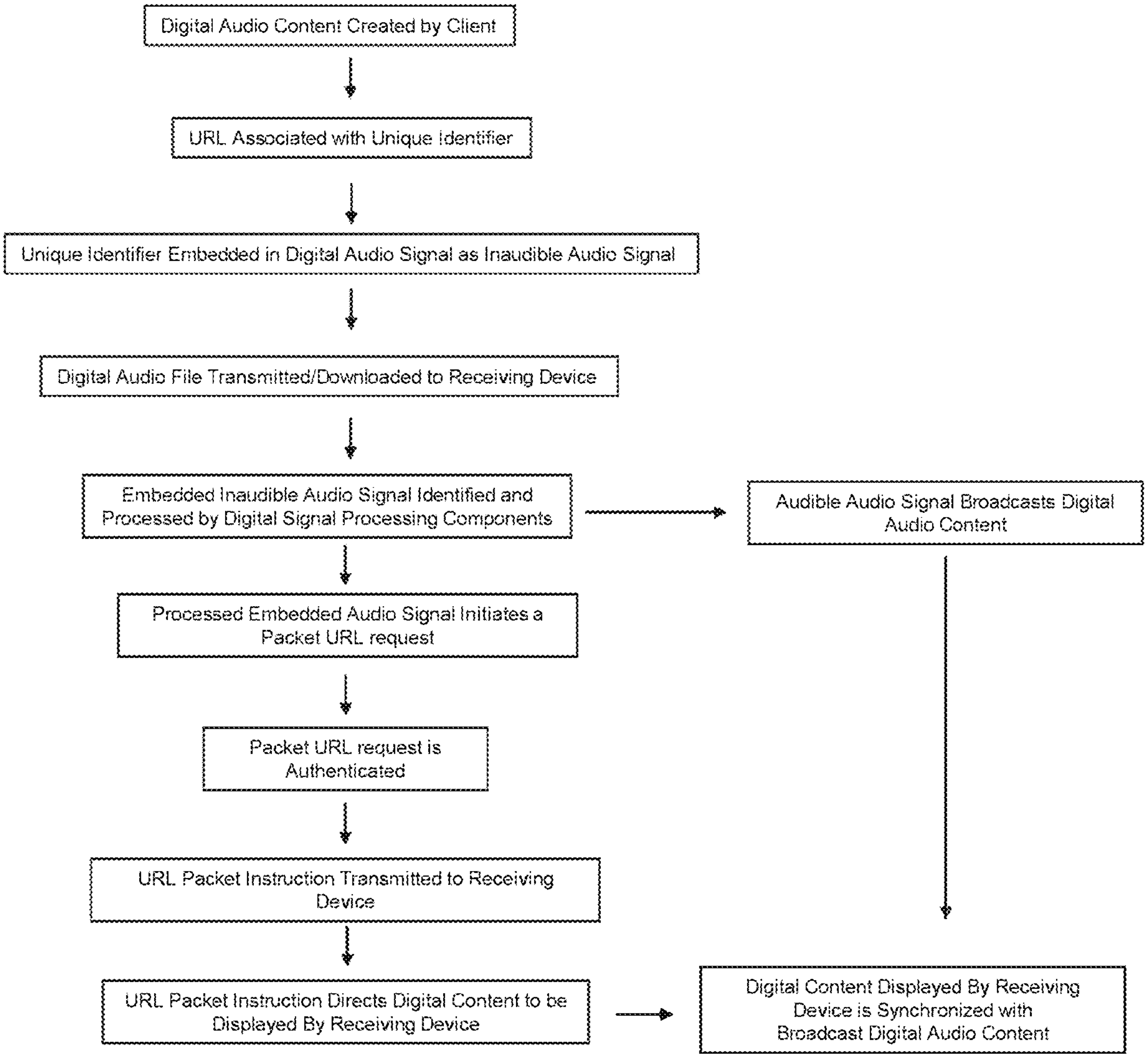
FIG. 5 shows the functional operation of an exemplary encode and decode process of the invention's secure transmission and processing system of an embedded audio stream using digital signal processing (DSP) prior or in parallel to a digital audio signal in one embodiment thereof.

FIG. 3 shows an exemplary decode process of the invention's secure transmission and processing system in one embodiment thereof (300), which according to the present invention includes the signal input, recognition, validation request, and return of URL steps respectively, as well as the resultant operation of the receiving device to load the URL page, in one embodiment thereof. Included are management data and information logs. Specifically, in the embodiment shown, the present invention includes a computer executable software program, shown here as an Application Programming Interface (API) (301) responsive to a client application (302) operating on a receiving device (313) of the invention. In this embodiment, the API (301) of the invention is embedded in the operational system of the client application (302) of the receiving device consistent with the receiving device's operating system. This embedded computer executable program (304) is configured to receive and extract and process a digital audio signal (313) containing an embedded unique identifier (304) transmitted or downloaded onto the receiver (313). The embedded computer executable program (304) recognizes the embedded encrypted packet (305) having the embedded unique identifier in the transmitted audio signal (314) which initiates (306) a URL request (308) directed to the secure server (309) of the invention storing the URL and packet information. The URL request (308) is authenticated, and the server and user data stored, and the encrypted target URL is returned to the receiving device (313) where it is recognized and confirmed by the API (301) and decrypted. The receiving device (313) is then directed (307) to load the webpage associated with that URL. In certain embodiments, display of the digital content associated with the URL will be automatic, while in other embodiments, a call-to-action prompt may be presented to a user to initiate the call URL Request. The present invention may also include systems and methods to securely transmit and process digital content to a receiving device. As shown in FIG. 5, a content creator or distributor may generate digital audio content, such as an exemplary podcast or other broadcast or digital display having an audio component as described herein. As noted above, as part of the encode process, the client can associate one or more URLs with a unique identifier as described below. This unique identifier may be embedded in a digital audio signal, such as a podcast or other broadcast having an audio component. As described above, the unique identifier may be embedded as an inaudible audio signal forming an encrypted packet. Again, as shown in FIG. 5, the digital audio signal containing the audio content may be transmitted, or downloaded to a receiving device where the embedded inaudible audio signal is recognized and initiates a computer executable program directing the receiving device to initiate a packet URL request, which can further be authenticated as described herein. Upon authentication of the URL request the target URL may be transmitted to the receiving device which directs the receiving device to access the URL or display the selected digital content selected by the client. In this embodiment, the audio signal, which may or may not still include the embedded inaudible audio signal may be broadcast by the receiving device, preferably through a speaker which may be integral with, or a separate wirelessly linked device. In this embodiment, the digital content/URL is displayed in a synchronized manner as described below. Notably, in alternative embodiment, an audible signal may be provided as a prompt to a listener that a digital content/URL is ready to be displayed or displaying on the receiving device.

The present invention may include systems and methods to securely transmit and process digital content, and preferably an inaudible or ultrasonic unique packet instruction, to a receiving device, instructing the device to access a URL. In this preferred embodiment, a third-party content creator may generate a target URL to be securely transmitted to a receiving device. As shown in FIG. 1, a third-party content creator, generally referred to as a "client" may establish a client computer system, which may include a general-purpose computer system or network configured to be responsive to a secure server through a wired or wireless network. To generate a URL to be transmitted, a client may access the client computer system, and further access through a browser application a secure website or application for the entry of a URL to be transmitted. In this embodiment, the client can access the secure website or application through an account login, which may include a dual factor authenticated secure login protocol.

Upon being granted access to the secure website or application, a user may enter a URL to be transmitted through a URL entry screen. Additional parameters of the system can further be adjusted by the client through a user setting screen. Additional parameters may include, but not be limited to coordinating the timing and type of the transmission of one or more URLs to be transmitted to a receiving device, and/or selection of pre-populated URLs and the like. For example, in a preferred embodiment, the step of inputting one or more target URLs may include inputting a plurality of target URL's to be transmitted to a secure server in series, in parallel, at a pre-determined time or event, or in response to an automated or manual signal from the client, user or other third party.

The target URL may next be transmitted to a secure server where it may further be encrypted and stored for later transmission to a mobile device. Transmission of the target URL may be through a LAN/IT connection, or any other appropriate wired or wireless network connection that would be readily understood by those of ordinary skill in the art. Examples of appropriate wired or wireless networks that may be configured to execute any wired or wireless delivery of the invention may be selected from the group consisting of: an internet network, a wireless network, a Local Area Network (LAN) connection, a Wide Area Network (WAN), Metropolitan Area Network (MAN)

Figure 2:
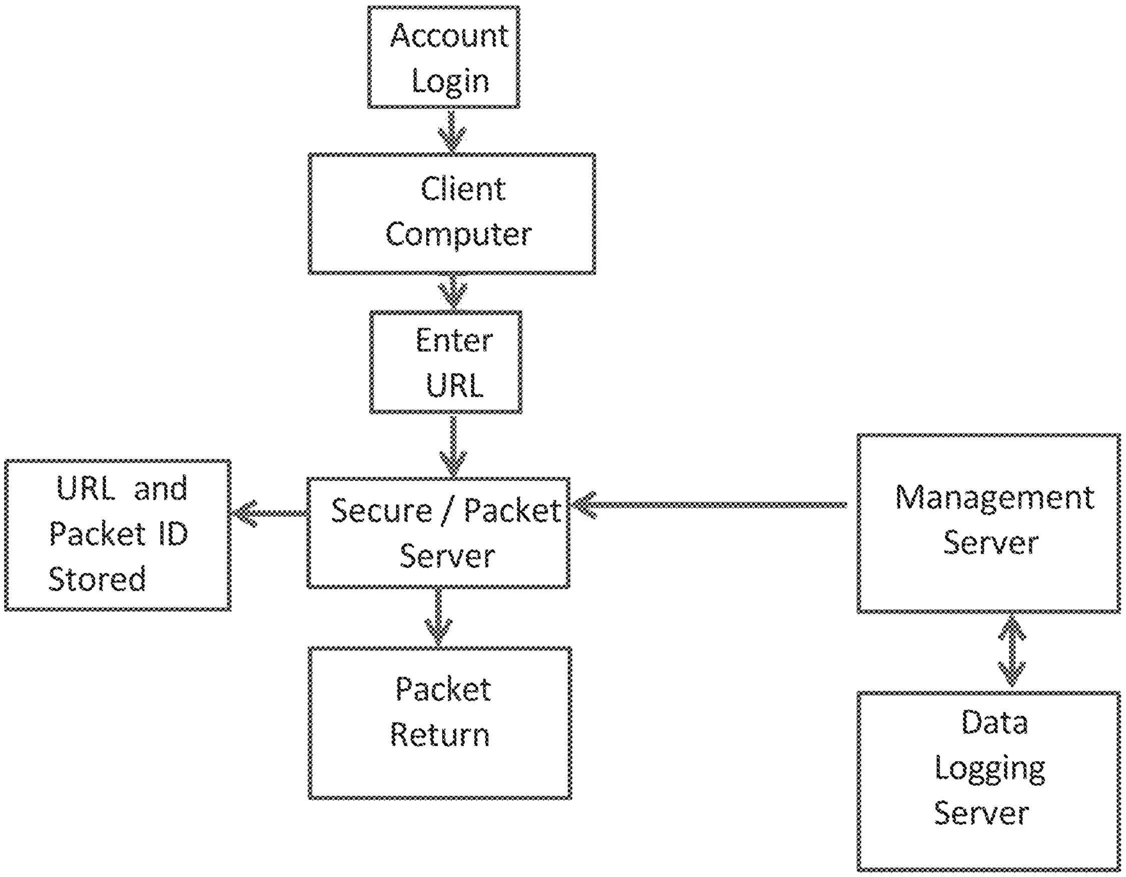
FIG. 2 shows a stepwise block diagram operation of the encode process according to the present invention this includes the client login screen and connection to the host server for URL submission and packet creation, return of packet for introduction to transmit medium, in one embodiment thereof.

As next shown in FIG. 2, the secure server, sometimes referred to as a "packet server" or "client's packet server" may recognize the transmission of the target URL and generate a unique identifier, such as a random numerical identifier that is associated with the target URL. This unique identifier may be embedded into an inaudible audio file, such as a podcast or other digital broadcast, forming an encrypted packet that can be transmitted back to a client computer system. Notably, while in this example only a single URL is indicated, in alternative embodiments multiple URLs may be input by a client and transmitted to a secure server where they may each be associated with a unique identifier and embedded in an individual digital audio file, while in still other embodiments multiple URLs may be input by a client and transmitted to a secure server where they may be associated with a single unique identifier and embedded in an digital audio file, such as a podcast or other digital broadcast as described herein.

As noted above, in certain embodiments the encrypted packet containing the unique identifier embedded in a digital audio file (sometimes referred to as an "executable audio file," or "executable digital audio file") comprises an audible audio file configured to include an embedded inaudible audio signal. In a preferred embodiment, the encrypted packet containing said unique identifier embedded in an executable audio file is configured to generate an inaudible, subaudible or ultrasonic audio signal. In still further preferred embodiments, the encrypted packet of the invention may include a Waveform Audio (WAV) file or any other type of audio file format embedding the unique identifier as an inaudible ultrasonic signal.

Referring again to FIG. 1, in this embodiment, the encrypted packet, sometimes referred to as a "packet" may be transmitted from the secure server to the client computer system where it may further be integrated into an audio signal, for example an audio signal configured to transmitted or downloaded by a receiving device. Notably, a receiving device of the invention may include any digital device configured to receive and process an audio signal. Examples of receiving devices may include mobile and fixed devices of the invention and may be selected from the group consisting of smart television, a computer device, a smartphone, a laptop, a personal digital assistant (PDA), a tablet, a smartwatch, and a mobile communications device.

Figure 4:
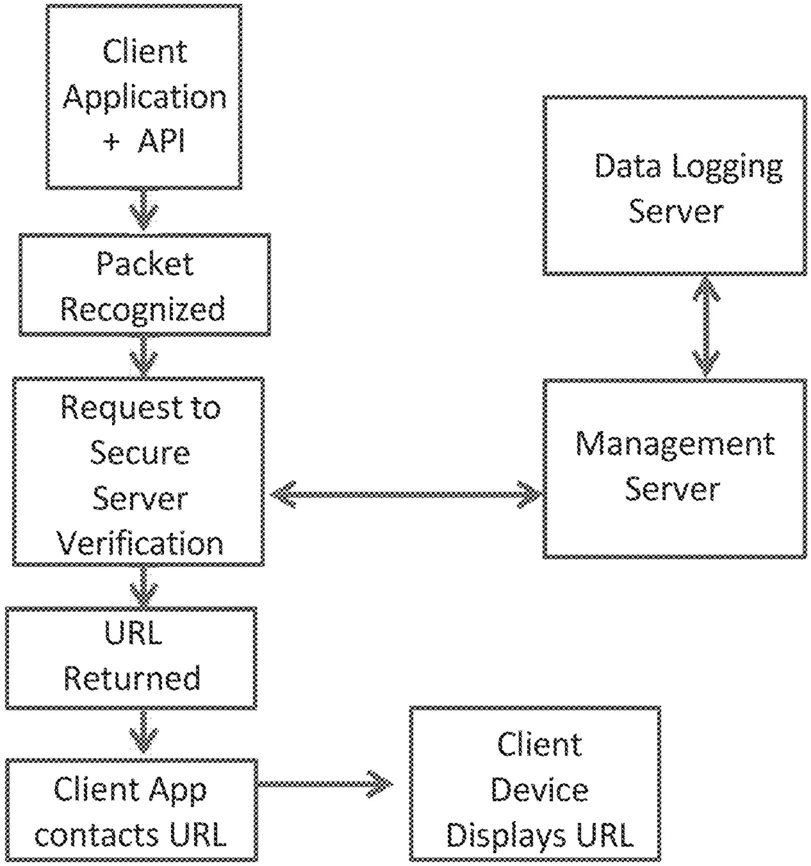
FIG. 4 shows a stepwise block diagram of the decode process according to the present invention this includes the signal input, recognition, validation request, and return of URL steps respectively, as well as the resultant operation of the receiving device to load the URL webpage, in one embodiment thereof. Included are management data and information logs.

Generally referring now to FIGS. 3-4, a mobile or fixed device, having one or more processors responsive to a memory, and configured to receive and DSP processes the embedded audio signal, which may preferably be inaudible, may be actively or passively activated by a user, or in response to reception of an audio signal having an encrypted packet. In a preferred embodiment, the mobile or fixed device may include a DSP processor receiver that can identify and separate an embedded inaudible audial signal as described herein from the audile digital audio signal containing the broadcast.

Again, referring to FIGS. 3-4, upon reception, or accessing of the digital audio signal, a computer executable program recognizes the encrypted packet through one or more DPSs which then initiates a URL request to be sent by the receiving device to the secure server. As noted above, this URL request may be transmitted to the secure server through any appropriate wired or wireless connection or network as identified above. The URL request may be authenticated by the secure server. In one embodiment, the URL request from the receiving device may include the unique identifier from the received digital audio signal, which is compared against the unique identifier stored on the secure server and associated with the target URL. If the unique identifiers match, the URL request is authenticated, and the URL packet instruction is transmitted to the receiving device of the invention. As noted above, the target URL may be encrypted and stored on the secure server. In one embodiment, upon authentication of the URL request the encrypted target URL packet instruction may be decrypted prior to being transmitted to a mobile device. In alternative embodiments, upon authentication of the URL request the encrypted target URL packet instruction may be transmitted to a packet instruction device where it is recognized and decrypted by the computer executable program of the invention, and preferably the API of the invention operably connected to a client's software application. Notably, the unique identifier of the encrypted packet ensures that only the correct URL is transferred to the mobile device, such that the target URL, unique identifier, encrypted packet and client application operate in a coordinate fashion so as to eliminate the risk that the wrong URL is provided from the secure server to the client application.

Upon decryption and/or reception of a decrypted target URL packet instruction by a receiving device, a computer executable program is initiated, and preferably the API of the invention operably connected to a client's software application, to recognize the target URL packet instruction and directing the mobile device to access said URL-associated website through a browser application and further display the visual and audio content of said URL-associated website on a receiving device, or a secondary device through a wireless casting system known in the art. This can be accomplished passively upon reception of the target URL packet instruction, or through engagement of a permission function on the mobile device, for example through the API of the invention operably connected to a client's software application on the user's device.

As described above, a user may passively or actively engage a receiving device (generally referred to as a "device" or "mobile device"), running a computer executable program, such as an API that is preferably operably responsive to a computer executable program, such as an application or "app", and preferably an application provided by the same third-party content provider. The API may be operably connected to one or more DSPs DP that are configured to detect and identify an inaudible audio signal embedded in a digital audio signal transmitted or downloaded by the receiving device. In this preferred embodiment, the API may be operably responsive to an application provided by the client that generated the URL, such that the step of displaying the URL-associated webpage appears to be seamlessly integrated into the client's application or may be subject to a call-to-action prompt that allows a user's al selectively allow, delay, or deny the accessing of the URL or display of digital content.

One embodiment of the invention include novel methods and systems to securely submit digital content. In this embodiment, a client, as defined above may identify and generate digital content that it wishes to securely transmit to a mobile device. The client may generate the digital content of the invention which may be accessible through a website accessible through a target URL. In this preferred embodiment, a client may submit a URL to be encoded with a unique identifier and stored on a secure server. In one embodiment, this secure server may be a third-party server, or may be a client server that is responsive to a management server configured to generate or control a secure server in executing the generation of a unique identifier and associating it with the target URL.

As shown in FIG. 1, in one embodiment, the URL may be responsive to a data logging server that stores parameters that the client has established as generally described above. The data logging server may further record and store client login information as well as usage data. This data logging server may be responsive to a management server that may, in certain embodiment generate, or direct the generation by another server, a unique identifier to be associated with the logged URL. The parameters of the management server may be adjusted by a setting module responsive to the management server and/or the secure server. It should be noted that while various server modules have been shown in the Figures and description, in certain embodiments, all such functions may be executed by a single server or like device.

The unique identifier of the invention may be embedded in an executable audio file and further transmitted through a transmission device, which may be separate or the same as the receiving device. Regardless of its source, the audio file of the invention may be received by a receiving device having one or more processors responsive to a memory configured to activate a computer executable program, such as an API, upon receiving the audio signal having the embedded unique identifier. Again, referring to FIG. 1-2, a unique identifier embedded in the executable audio file may be for an encrypted packet that may be transmitted to a client computer to be integrated into an audible audio signal that may be part of a planned audio, video or streaming broadcast. The unique identifier embedded in executable audio file may generate an inaudible audio signal, which in alternative embodiments the audio signal may be audible, subaudible or ultrasonic. In a preferred embodiment, the unique identifier embedded in executable audio file may include a Waveform Audio (WAV) file or any other audio file format embedding the unique identifier that when executed produces an ultrasonic audio signal. In one embodiment, the unique identifier embedded in executable audio file may be directly embedded into a broadcast flow at a transmission studio, or anywhere along the chain of transmission for the broadcast signal.

The audio signal embedding a unique identifier may be received by a receiving device, such that upon reception of the audio signal embedding a unique identifier, the computer executable program is activated and transmits a URL request to a secure server. The URL request is authenticated, for example by comparing the unique identifier of the URL request with the unique identifier associated with the URL stored on a secure server. Upon authentication, the URL is sent to the receiving device, for example through an appropriate wired or wireless network and further directing the mobile device to access the URL and display the visual and audio content of said URL-associated website, preferably though a browser application of the device.

The term "inaudible" does not apply to any specific frequency range but is used as a generic description for an audio or other signal that is generally inaudible, indiscernible, or only slightly discernable by humans and the like. (e.g., frequencies generally above 20 Hz or below 20 kHz). Notably, due to variations in the hearing perceptions among various individual and population distributions, the term "inaudible" may encompass audio signals that are perceptible to humans, as such the term "inaudible" encompasses both slightly audible, subaudible, and inaudible signals.

In one embodiment, an ultrasonic audio signal may be an inaudible signal configured at frequency range at which humans are typically unable to perceive sound (e.g., frequencies generally below 20 Hz or above 20 kHz).

As used herein a "mobile device" is any computer device or system configured to operate the computer executable program of the invention and receive an audio signal. A mobile device may be selected from the group consisting of a smartphone, a laptop, a personal digital assistant (PDA), a tablet, a smartwatch, a smart television running client application and a mobile communications device.

In one embodiment, used herein a "receiver" may include any hardware or software device or system, or a device or system comprising a combination of hardware and software that is configured to receive and process a signal, such as a wired or wireless digital signal, or preferably an ultrasonic signal. In one embodiment a receiver may include a microphone, or other computer-enabled device capable of detecting, processing and/or receiving by direct means an audio signal, and preferably an ultrasonic signal. In certain preferred embodiment, a receiver or smart television may be operably connected to a computer executable program, such as an API of the invention. In another embodiment, a receiver may include a device responsive to a wired or wireless signal, such as an internet or cellular signal that can receive, for example, a packet URL request of the invention. In this embodiment, the present invention allows a third-party content generator to create a unique identifier based on a submitted internet URL, or other digital content to a proprietary secure server. The resultant unique identifier can then be directly transmitted through any digital signal, such as a wired or wireless internet or cellular signal, as well as an audio signal and then received by a receiving device, such as a mobile device that includes a computer executable program configured to receive and identify the unique identifier transmitted by the digital signal. The receiving device is programmed to contact the secure server with a packet URL request. The URL request can be authenticated by comparing the unique identifier provided in the URL request with the unique identifier stored on the secure server that is associated with the target URL. If the unique identifiers match, the URL request is authenticated and the URL, which may be encrypted, is provided to the receiving device, where it may further be decrypted through a digital signal.

A "computer," "computer system," "host," "server," or "processor" may be, for example and without limitation, a processor, microcomputer, minicomputer, server, mainframe, laptop, personal data assistant (PDA), wireless e-mail device, cellular phone, pager, processor, scanner, or any other programmable device configured to transmit and/or receive data over a network. Computer systems and computer-based devices disclosed herein may include memory for storing certain software modules used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

As used herein a "URL-associated website" generally refers to one, or a set of related webpages served from a single web domain, and is hosted on at least one web server, accessible via a network such as the Internet or a private local area network through an Internet address, or URL. All publicly accessible websites collectively constitute the World Wide Web. Each webpage is a document, typically written in plain text interspersed with formatting instructions in a language, e.g., Hypertext Markup Language (HTML, XHTML).

As described above, in certain embodiments the computer executable program may direct a mobile device to access a URL, and further may direct the mobile device to display the visual and audio content of said URL-associated website. In this embodiment, the computer executable program, and preferably an API working in conjunction with a software application on said mobile device may cause a separate application, generally referred to as a browser to navigate to a webpage associated with the URL. The browser may display the website, which is rendered according to its HTML markup instructions onto a display terminal, such a screen of a mobile device, where the content and HTML markup instructions have been transported with the Hypertext Transfer Protocol (HTTP).

Any of the computing systems described herein, whether controlled by end users directly or by a remote entity controlling one or more components of said system of the invention, can be implemented as software components executing on one or more general purpose processors or specially designed processors such as programmable logic devices (e.g., Field Programmable Gate Arrays (FPGAs)) and/or Application Specific Integrated Circuits (ASICs) designed to perform certain functions or a combination thereof. In some embodiments, code executed during operation of the systems of the invention (computational elements) can be embodied by a form of software elements which can be stored in a nonvolatile storage medium (such as optical disk, flash storage device, mobile hard disk, cloud-based systems etc.), including a number of instructions for making a computer device (such as personal computers, servers, network equipment, etc.). Algorithms, machine learning models and/or other computational structures described herein may be implemented on a single device or distributed across multiple devices. The functions of the computational elements may be merged into one another or further split into multiple sub-modules.

The hardware device of the invention can be any kind of device that can be programmed including, for example, any kind of computer including smart mobile devices (watches, phones, tablets, and the like), personal computers, powerful servers or supercomputers, or the like. The device includes one or more processors such as an ASIC or any combination processors, for example, one general purpose processor and two FPGAs. The device may be implemented as a combination of hardware and software, such as an ASIC and an FPGA, or at least one microprocessor and at least one memory with software modules located therein. In various embodiments, the system includes at least one hardware component and/or at least one software component. The embodiments described herein could be implemented in pure hardware or partly in hardware and partly in software. In some cases, the disclosed embodiments may be implemented on different hardware devices, for example using a plurality of CPUs equipped with GPUs capable of accelerating and/or coordinating computation. Each computational element may be implemented as an organized collection of computer data and instructions. System software typically interfaces with computer hardware, typically implemented as one or more processors (e.g., CPUs or ASICs as mentioned) and associated memory. In certain embodiments, the system software includes operating system software and/or firmware, as well as any middleware and drivers installed in the system. The system software provides basic non-task-specific functions of the computer. In contrast, the modules and other application software are used to accomplish specific tasks. Each native instruction for a module is stored in a memory device and is represented by a numeric value.

At one level a computational element is implemented as a set of commands prepared by the programmer/developer. However, the module software that can be executed by the computer hardware is executable code committed to memory using "machine codes" selected from the specific machine language instruction set, or "native instructions," designed into the hardware processor. The machine language instruction set, or native instruction set, is known to, and essentially built into, the hardware processor(s). This is the "language" by which the system and application software communicates with the hardware processors. Each native instruction is a discrete code that is recognized by the processing architecture and that can specify particular registers for arithmetic, addressing, or control functions; particular memory locations or offsets; and particular addressing modes used to interpret operands. More complex operations are built up by combining these simple native instructions, which are executed sequentially, or as otherwise directed by control flow instructions.

The inter-relationship between the executable software instructions and the hardware processor may be structural. In other words, the instructions per se may include a series of symbols or numeric values. They do not intrinsically convey any information. It is the processor, which by design was preconfigured to interpret the symbols/numeric values, which imparts meaning to the instructions.

All of the methods described herein may include storing results of one or more steps of the method embodiments in memory. The results may include any of the results described herein and may be stored in any manner known in the art. The memory may include any memory described herein or any other suitable storage medium known in the art. After the results have been stored, the results can be accessed in the memory and used by any of the method or system embodiments described herein, formatted for display to a user, used by another software module, method, or system, etc. Furthermore, the results may be stored "permanently," "semi-permanently," temporarily, or for some period of time. For example, the memory may be random access memory (RAM), and the results may not necessarily persist indefinitely in the memory.

Notably, there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically oriented hardware, software, and or firmware.

In some embodiment described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device-detectable instructions operable to perform as described herein, and preferrable transmitted to a mobile device as an audio signal, and even more preferably an inaudible audio signal. In some variants, for example, implementations may include an update or modification of existing software or firmware, or of gate arrays or programmable hardware, such as by performing a reception of or a transmission of one or more instructions in relation to one or more operations described herein. Alternatively, or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively, or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High-Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission devices or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

The various embodiments described herein can be implemented by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

The various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

It should be noted that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Moreover, the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "responsive" such that the desired functionality is achieved. Hence, any two components herein combined to achieve a particular functionality can be seen as "responsive with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly intractable, and/or wirelessly interacting components, and/or logically interacting, and/or logically intractable components.

In some instances, one or more components may be referred to herein as "configured to," "configurable to," "responsive to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein. It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B".

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

What is claimed is:

1. A method of securely transmitting and extracting inaudible encrypted audio signals comprising the steps of:

i) establishing digital content to be transmitted by an audible digital audio signal;

ii) associating a unique identifier with one or more Uniform Resource Locators (URLs) forming an encrypted packet;

iii) embedding said encrypted packet in said audible digital audio signal as an inaudible audio signal;

iv) transmitting said encrypted packet through said digital audio signal to a receiving device having one or more digital signal processors (DSPs) configured to process said digital audio signal;

v) identifying said inaudible audio signal embedded in said audible digital audio signal, wherein said step of identifying initiates a packet URL request directed to a secure server;

vi) authenticating said packet URL request by comparing it with said unique identifier generating a URL packet request instruction upon authentication, vii) transmitting said URL packet request instruction to said receiving device, wherein said URL packet request instruction directs said receiving device to display the one or more URLs; and viii) wherein said audible digital audio signal is broadcast by said receiving device or responsive speaker, and is optionally synchronized with the display of said one or more URLs; and ix) determining an available bandwidth of digital audio transmission to allocate encryption packet frequencies within said available bandwidth for said encrypted packet.

2. The method of claim 1, wherein said digital content comprises a streaming podcast, a downloaded podcast, an audio stream, a broadcast audio stream, or a downloaded audio file.

3. The method of claim 1, wherein said encrypted packet comprises a Waveform Audio (WAV) file, or any other audio file format embedding said unique identifier.

4. The method of claim 1, wherein said receiving device is selected from the group consisting of: a smartphone, a laptop, a computer, and a smart television.

5. The method of claim 1, wherein said inaudible audio signal further comprises an audible prompt.

6. The method of claim 1, further comprising programming the embedded inaudible audio signal to fall within the available bandwidth parameters of the expected transmission pathway.

7. The method of claim 6, wherein said transmission pathway is selected from the group consisting of: over-the-top streaming transmission, a broadcast audio stream, streaming audio transmission, downloaded audio file transmission.

8. A method of securely transmitting and extracting inaudible encrypted audio signals comprising the steps of:

i) generating a target Uniform Resource Locator (URL) to be accessed by a receiving device;

ii) transmitting said target URL to a secure packet server to be stored;

iii) associating said target URL with a unique identifier forming an encrypted packet;

iv) embedding said encrypted packet in an audible audio signal as an inaudible audio signal;

v) transmitting said audible audio signal having said embedded encrypted packet to a receiving device;

vi) activating one or more digital signal processors (DSPs) of the receiving device to process the audio signal, wherein the step of processing activates a computer executable program that initiates the following steps:

a) recognizing said encrypted packet;

b) initiating a packet URL request to a secure server;

vii) generating a URL packet request instruction upon authentication of said packet URL request;

viii) sending said URL packet request instruction to said receiving device, wherein said URL packet request instruction directs said receiving device to access said target URL; and ix) wherein said audible audio signal is broadcast by said receiving device or responsive speaker and is optionally synchronized with the display of said target URL.

9. The method of claim 8, wherein said audible digital audio signal comprises a streaming podcast, a downloaded podcast, an audio stream, a broadcast audio stream, or a downloaded audio file.

10. The method of claim 8, wherein said receiving device is selected from the group consisting of: a smartphone, a laptop, a computer, and a smart television.

11. The method of claim 8, wherein said inaudible audio signal further comprises an audible prompt.

12. The method of claim 8, further comprising programming the embedded inaudible audio signal to fall within the available bandwidth parameters of the expected transmission pathway.

13. The method of claim 12, wherein said transmission pathway is selected from the group consisting of: over-the-top streaming transmission, a broadcast audio stream, streaming audio transmission, downloaded audio file transmission.

14. The method of claim 8, further comprising the step of directing said packet URL request to a third-party server which is responsive to said secure server.

15. The method of claim 14, wherein said step of generating a target URL comprises the steps of:

a) establishing a client computer responsive to said secure server;

b) accessing said client computer; and c) inputting one or more target URLs to be transmitted to said secure server.

16. The method of claim 15, wherein said step of inputting one or more target URLs comprises the step of inputting a plurality of target URL's to be transmitted to a secure server in series, in parallel, at a pre-determined time or event, or in response to an automated or manual signal.

17. The method of claim 15, wherein said step of inputting one or more target URLs comprises the step of automatically populating a plurality of target URLs from a pool of pre-populated target URLs.

18. The method of claim 8, wherein the step of directing said mobile device to access said URL comprises the step of directing said mobile device to access said URL through a browser application.

19. The method of claim 8, wherein said step of transmitting said target URL to a secure packet server comprises the step of transmitting said target URL to a secure packet server to be stored through a management server.

20. The method of claim 8, further comprising the step of communicating with a Data Logging server.

* * * * *